(12) United States Patent
Kawatsu et al.

(10) Patent No.: US 10,057,450 B2
(45) Date of Patent: Aug. 21, 2018

(54) IMAGE READING APPARATUS, IMAGE FORMING APPARATUS AND IMAGE FORMING SYSTEM

(71) Applicant: Konica Minolta, Inc., Chiyoda-ku, Tokyo (JP)

(72) Inventors: Kenji Kawatsu, Kodaira (JP); Tsuyoshi Yoneyama, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/603,149

(22) Filed: May 23, 2017

(65) Prior Publication Data

US 2017/0374225 A1 Dec. 28, 2017

(30) Foreign Application Priority Data

Jun. 27, 2016 (JP) ................. 2016-126255

(51) Int. Cl.
*H04N 1/04* (2006.01)
*H04N 1/193* (2006.01)
*H04N 1/00* (2006.01)

(52) U.S. Cl.
CPC ......... *H04N 1/193* (2013.01); *H04N 1/00519* (2013.01); *H04N 1/00615* (2013.01); *H04N 1/00798* (2013.01); *H04N 2201/0081* (2013.01)

(58) Field of Classification Search
CPC ... H04N 2201/0094; H04N 2201/0081; H04N 1/00411; H04N 1/00708; H04N 1/00973; H04N 1/06; H04N 1/113; H04N 2201/0082; H04N 1/00037; H04N 1/00082; H04N 1/00204; H04N 1/00244; H04N 1/00307; H04N 1/00344; H04N 1/00477; H04N 1/00771; H04N 1/00803; H04N 1/00827; H04N 1/00925; H04N 1/0464;

(Continued)

(56) References Cited

U.S. PATENT DOCUMENTS 4,737,856 A * 4/1988 Shimizu ............... H04N 1/0057
    358/449
5,182,650 A * 1/1993 Inoue ................... B41J 2/16517
    346/3

(Continued)

FOREIGN PATENT DOCUMENTS

JP    2014-045301 A    3/2014
JP    2015-226084 A    12/2015

*Primary Examiner* — Negussie Worku
(74) *Attorney, Agent, or Firm* — Squire Patton Boggs (US) LLP (57) ABSTRACT

An image reading apparatus 300 comprises: the scanner device SD which reads information about a sheet P conveyed on a paper conveying route PP and information about a position, a form and a color of an image formed on the sheet P; a spectrophotometer CI which reads information about a color of an image formed on a sheet P conveyed on the paper conveying route PP; and a support base TR which incorporates the paper conveying route and a motor for conveying a sheet and can be pulled out from a main body together with the paper conveying route and the motor. The scanner device SD is not mounted on the support base TR but fixed to the main body of the image reading apparatus. The spectrophotometer CI is mounted on and fixed to the support base TR, and spaced from the paper transfer route PP by a predetermined distance.

17 Claims, 5 Drawing Sheets

(58) Field of Classification Search
CPC ....... H04N 2201/3269; H04N 13/0221; H04N 13/0271; H04N 13/0275; H04N 19/426; H04N 1/00015; H04N 1/00039; H04N 1/00251; H04N 1/0032; H04N 1/00336; H04N 1/00347; H04N 1/00408; H04N 1/00413; H04N 1/0044; H04N 1/00464; H04N 1/00474; H04N 1/00496; H04N 1/00514; H04N 1/00519; H04N 1/00615; H04N 1/00798; H04N 1/193
USPC ..... 358/1.12, 1.18, 1.9, 498, 1.13, 2.1, 3.06, 358/3.21, 3.28, 473, 474, 513, 514, 496, 358/497; 399/297, 16, 301, 302, 341, 399/394, 410, 49, 66
See application file for complete search history.

(56) References Cited

U.S. PATENT DOCUMENTS

| | | | | |
|---|---|---|---|---|
| 5,204,736 A * | 4/1993 | Abe | .......................... | H04N 1/46 346/3 |
| 5,315,397 A * | 5/1994 | Inoue | ................. | H04N 1/32379 347/3 |
| 5,436,735 A * | 7/1995 | Tanabe | ............. | G03G 15/04018 358/452 |
| 5,570,206 A * | 10/1996 | Yoshinaga | ........... | H04N 1/0473 358/412 |
| 5,635,963 A * | 6/1997 | Kuboki | ................... | B41J 11/008 347/9 |
| 2005/0274252 A1* | 12/2005 | Wakabayashi | ........... | B26D 1/08 83/697 |
| 2006/0083564 A1* | 4/2006 | Yazawa | .................. | B41J 29/023 399/363 |
| 2007/0103741 A1* | 5/2007 | Suzuki | ............... | H04N 1/00572 358/498 |
| 2009/0087199 A1* | 4/2009 | Moro | ................. | G03G 15/5062 399/15 |
| 2014/0347712 A1* | 11/2014 | Yoneyama | ........... | H04N 1/0057 358/498 |
| 2015/0242716 A1* | 8/2015 | Kurokawa | ......... | H04N 1/00551 358/1.12 |
| 2015/0281483 A1* | 10/2015 | Shiomi | .............. | H04N 1/00533 358/474 |
| 2016/0050334 A1* | 2/2016 | Hachiro | ................... | H04N 1/40 358/449 |

* cited by examiner

IMAGE READING APPARATUS, IMAGE FORMING APPARATUS AND IMAGE FORMING SYSTEM

CROSS-REFERENCE TO RELATED APPLICATIONS

The present application claims priority under 35 U.S.C. § 119 to Japanese Patent Application No. P2016-126255, filed Jun. 27, 2016. The contents of this application are herein incorporated by reference in their entirety.

BACKGROUND OF THE INVENTION

Field of Invention

The present invention relates to an image reading apparatus, an image forming apparatus and an image forming system.

Description of Related Art

Heretofore, an image reading apparatus is proposed in which it is possible to pull out an image reading unit for reading an original image in the horizontal direction, or pull out some constituents of the image reading apparatus in the horizontal direction so that an image reading unit can be removed. In the case of such an image reading apparatus, by the above drawer-type structure, it is possible to easily perform jam handling, checkup and replacement of specific parts, maintenance and the like (for example, refer to Japanese Patent Published Application No. 2015-226084 and Japanese Patent Published Application No. 2014-45301).

In the image reading apparatus, the image reading unit for reading information from an original or a printed sheet may be a unit which has to be installed with a higher positional accuracy in relation to a paper conveying route, a unit which has to be installed in a position to which vibration is hardly transmitted from a motor which drives conveyance rollers and the like installed on the paper conveying route, and the like unit.

However, in the case of the above conventional image reading apparatus, it is not taken into consideration what location an image reading unit should be installed in. Because of this, a positional accuracy may be reduced by installing an image reading unit, which has to be installed with a higher positional accuracy, in order that the image reading unit can be pulled out. Also, an image reading unit which has to be installed in a position to which vibration is hardly transmitted from a motor, may be installed in a position to which vibration is easily transmitted from a motor. Particularly, in the case of an image reading apparatus provided with a drawer-type structure and a plurality of image reading units, because of its complicated structure and limited available installation space, it becomes difficult to optimize an installation arrangement of the plurality of image reading units.

Incidentally, this is a common problem not only for an image reading apparatus but also for an image forming apparatus and an image forming system which incorporates the image reading apparatus.

SUMMARY OF THE INVENTION

To achieve at least one of the above-mentioned objects, reflecting one aspect of the present invention, an image reading apparatus comprises: a first image reading unit which reads information about a sheet conveyed on a paper conveying route and information about a position, a form and a color of an image formed on the sheet; a second image reading unit which reads information about a color of an image formed on a sheet conveyed on the paper conveying route; a support base which incorporates the paper conveying route and a motor for conveying a sheet and can be pulled out from a main body together with the paper conveying route and the motor, wherein the first image reading unit is not mounted on the support base but fixed to a main body of the image reading apparatus, and wherein the second image reading unit is mounted on the support base and fixed to the support base in a position spaced from the paper transfer route by a predetermined distance.

Also, to achieve at least one of the above-mentioned objects, reflecting one aspect of the present invention, an image forming apparatus forms an image on a sheet and incorporates an image reading apparatus comprising: a first image reading unit which reads information about a sheet conveyed on a paper conveying route and information about a position, a form and a color of an image formed on the sheet; a second image reading unit which reads information about a color of an image formed on a sheet conveyed on the paper conveying route; a support base which incorporates the paper conveying route and a motor for conveying a sheet and can be pulled out from a main body together with the paper conveying route and the motor, wherein the first image reading unit is not mounted on the support base but fixed to a main body of the image reading apparatus, and wherein the second image reading unit is mounted on the support base and fixed to the support base in a position spaced from the paper transfer route by a predetermined distance.

Furthermore, to achieve at least one of the above-mentioned objects, reflecting one aspect of the present invention, an image forming system includes an image forming apparatus which forms an image on a sheet, and an image reading apparatus comprising: a first image reading unit which reads information about a sheet conveyed on a paper conveying route and information about a position, a form and a color of an image formed on the sheet; a second image reading unit which reads information about a color of an image formed on a sheet conveyed on the paper conveying route; a support base which incorporates the paper conveying route and a motor for conveying a sheet and can be pulled out from a main body together with the paper conveying route and the motor, wherein the first image reading unit is not mounted on the support base but fixed to a main body of the image reading apparatus, and wherein the second image reading unit is mounted on the support base and fixed to the support base in a position spaced from the paper transfer route by a predetermined distance.

DETAILED DESCRIPTION OF THE PREFERRED EMBODIMENT

Hereinafter, a description is given of embodiments of the present invention with reference to the drawings.

Figure 1:
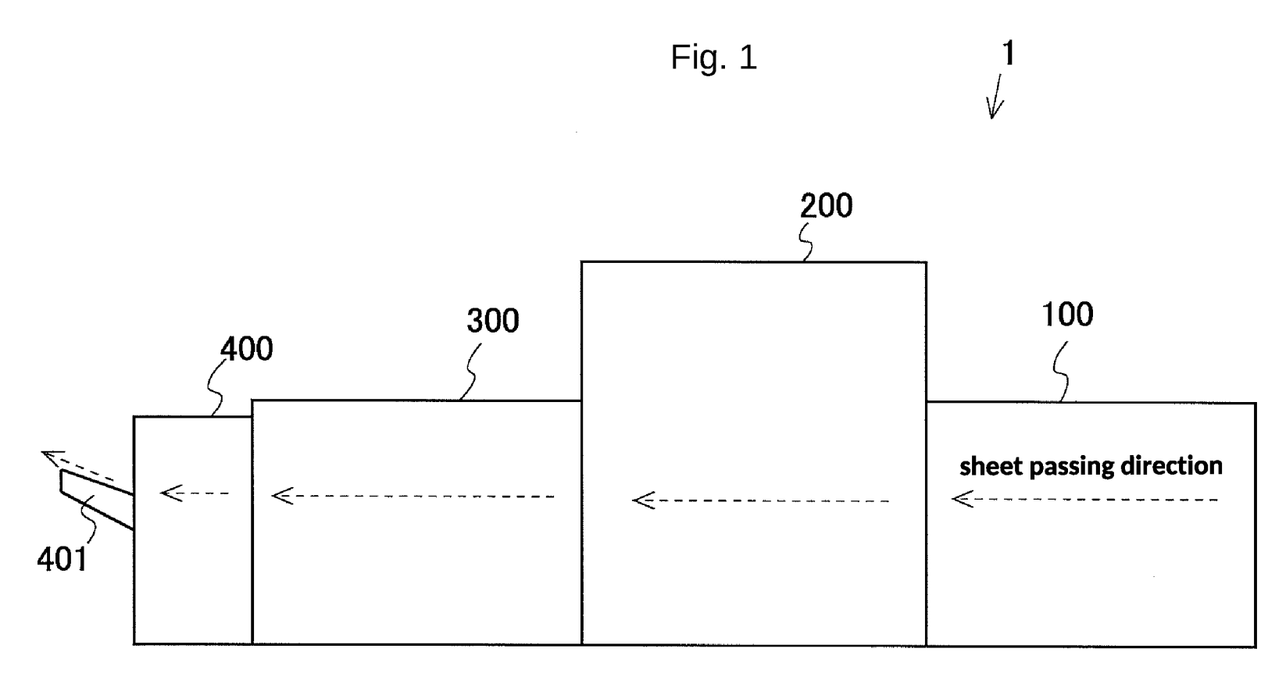
FIG. 1 is a configuration view for schematically showing an example of an image forming system in accordance with an embodiment of the present invention.

FIG. 1 is a configuration view for schematically showing an example of an image forming system 1 in accordance with an embodiment of the present invention. As shown in FIG. 1, the image forming system 1 includes a paper feed apparatus 100, an image forming apparatus 200, an image reading apparatus 300 and a discharge unit 400. The paper feed apparatus 100 feeds a sheet P to the image forming apparatus 200. The image forming apparatus 200 forms an image on a sheet fed by the paper feed apparatus 100. The image reading apparatus 300 reads a sheet on which an image is formed by the image forming apparatus 200, and performs various types of processing. The discharge unit 400 is provided with a catch tray 401, and discharges a sheet P, which is conveyed from the image reading apparatus 300, to the catch tray 401.

Figure 2:
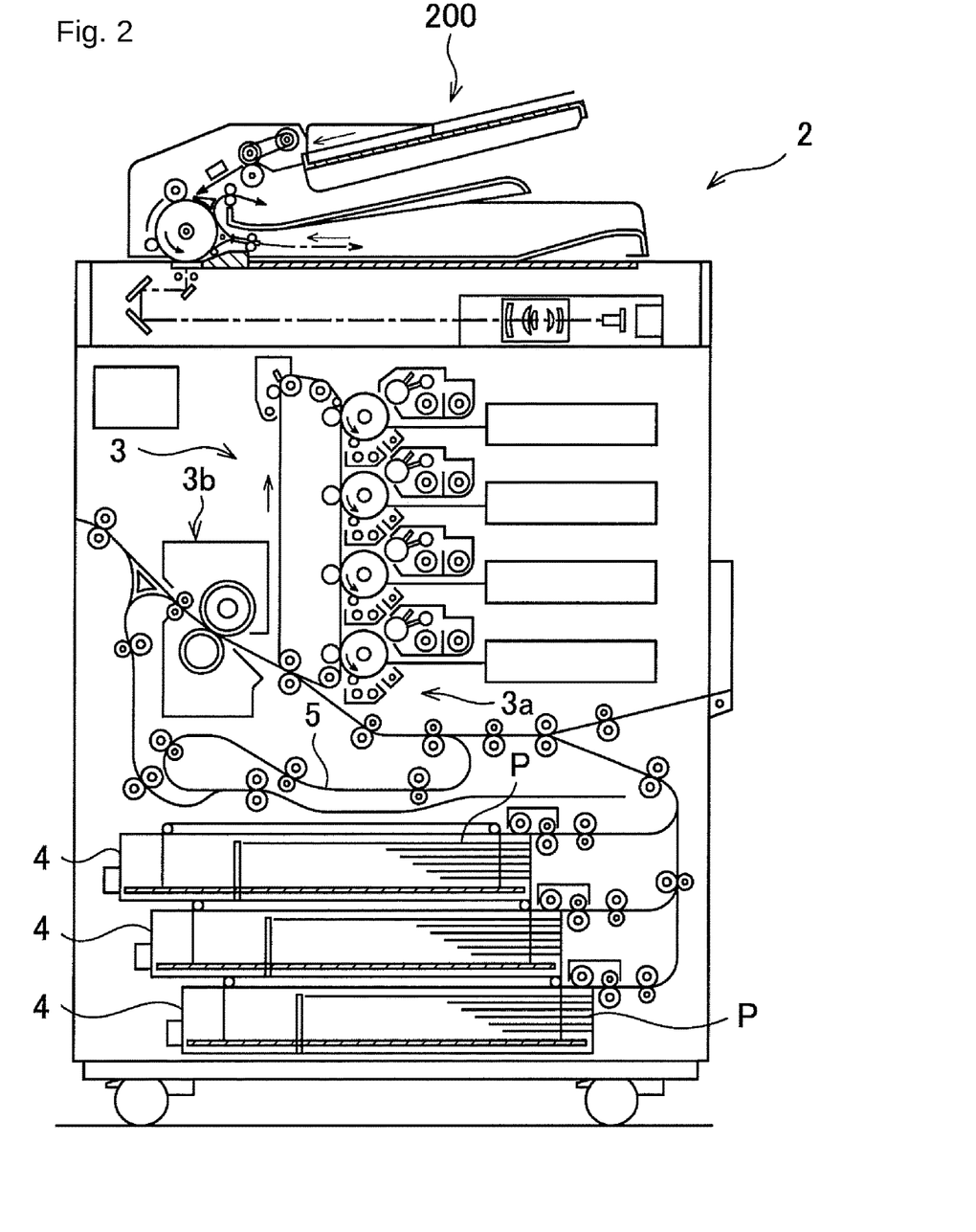
FIG. 2 is a configuration view for schematically showing an example of the image forming apparatus shown in FIG. 1.

FIG. 2 is a configuration view for schematically showing an example of the image forming apparatus 200 shown in FIG. 1. The image forming apparatus 200 is a tandem color image forming apparatus which includes a plurality of photoreceptor drums vertically arranged in contact with one intermediate transfer belt to form full-color images. The image forming apparatus 200 is provided with an image reading unit 2 consisting of an automatic document feeder and a scanning exposing device on top thereof, and an image forming unit 3 and the plurality of paper feed trays 4 at a bottom thereof.

The image reading unit 2 conveys an original placed on an original tray of the automatic document feeder by a paper conveying unit, and scans and exposes images formed on both or either side of the original to read image information. Also, the image reading unit 2 is configured to read image information of an original which is placed on a contact glass.

The image forming unit 3 receives sheets S supplied from the plurality of paper feed tray 4. The image forming unit 3 performs an image formation process on a sheet based on image information read by the image reading unit 2 or image information transmitted from a PC (Personal Computer) or the like.

The image forming unit 3 is provided with an image transfer unit 3a and a fixing unit 3b. The image transfer unit 3a forms toner images on photoreceptor units and transfers the toner images to a sheet P by an electrophotographic process for charging, exposing and developing. The image transfer unit 3a of this embodiment is of a type having an intermediate transfer belt. Toner images on a plurality of the photoreceptor units are transferred to the intermediate transfer belt. The toner images on the intermediate transfer belt are transferred to a sheet P.

The fixing unit 3b forms a nip portion between a heat roller and a pressure roller to convey a sheet P. The fixing unit 3b applies heat and pressure to the sheet P, while conveying the sheet through the nip portion. Toner melts by heat and pressure and is transferred and fixed to the sheet P as an image.

The image forming apparatus 200 is provided with a sheet reversing route 5 extending from the downstream side of the fixing unit 3b to the upstream side of the image transfer unit 3a. The sheet reversing route 5 is a route for reversing the front and back sides of a sheet P and conveying the sheet P to the image transfer unit 3a again. This sheet reversing route 5 makes it possible to form image formation on both the front and back sides of a sheet P.

Figure 3:
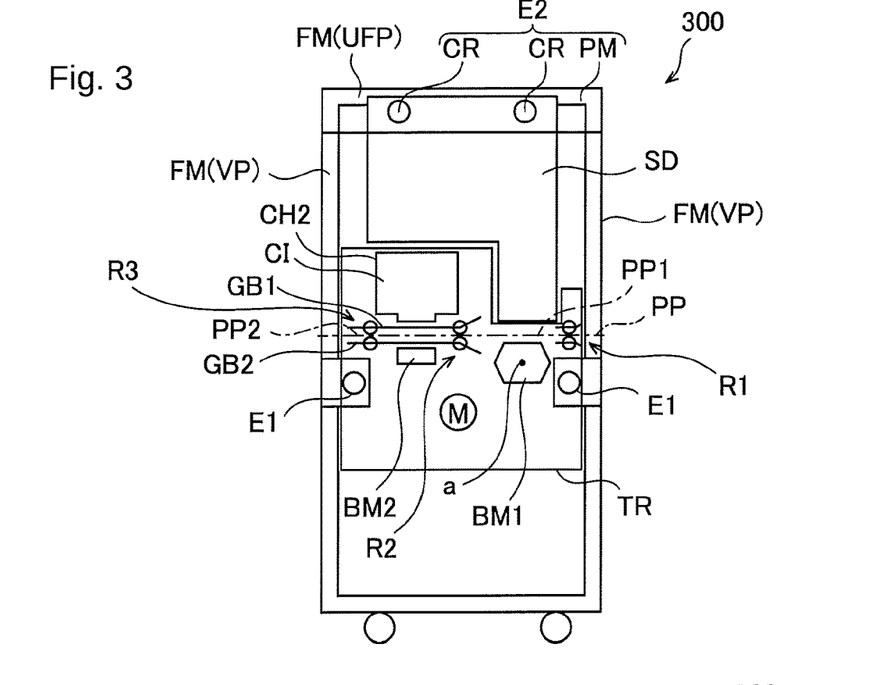
FIG. 3 is a front view for showing an example of an outline configuration of the image reading apparatus shown in FIG. 1.
Figure 4:
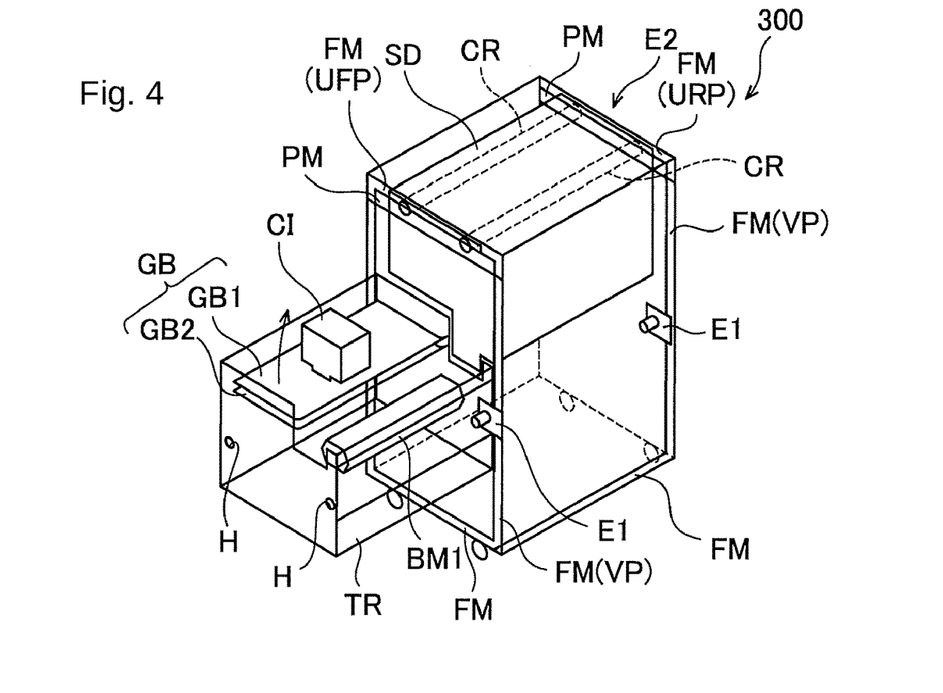
FIG. 4 is a perspective view for showing an example of an outline configuration of the image reading apparatus shown in FIG. 1.

FIG. 3 is a front view for showing an example of an outline configuration of the image reading apparatus 300 shown in FIG. 1. FIG. 4 is a perspective view for showing an example of an outline configuration of the image reading apparatus 300 shown in FIG. 1.

As shown in FIG. 3 and FIG. 4, the image reading apparatus 300 has a frame member FM as a skeleton. The frame member FM is a metal member which consists at least of the sides of a rectangular parallelepiped which forms a housing of the image reading apparatus 300. The image reading apparatus 300 is provided with a scanner device (a first reading unit) SD and a spectrophotometer (a second reading unit) CI. By this configuration, the image reading apparatus 300 reads information of a sheet P passing through a paper conveying route PP. Incidentally, the paper conveying route PP includes a first paper conveying route PP1 and a second paper conveying route PP2. The first paper conveying route PP1 is a route on which a sheet P is read by the scanner device SD while the sheet P is conveyed through the route. The second paper conveying route PP2 is a route on which a sheet P is read by the spectrophotometer CI while the sheet P is conveyed through the route.

The image reading apparatus 300 is provided with a support base TR which can be inserted and extracted in the horizontal direction toward the front side. The paper conveying route PP and the spectrophotometer CI are mounted on the support base TR. Furthermore, there are mounted a motor M for conveying a sheet P, a first background member BM1 and a second background member (background member) BM2 on the support base TR. The support base TR is positioned by a first member E1, which is provided on the frame member FM, when the support base TR is not pulled out, i.e., when the support base TR is inserted into a main body (the apparatus 300 except the support base TR).

The first member E1 is a projecting rod (only two members are illustrated in FIG. 3 and FIG. 4 respectively as the first member E1). The projecting rod is projecting toward the front from the vicinity of the middle of each of four vertical sections VP of the frame member FM extending in the vertical direction. Four holes H are formed through the support base TR (only two holes H are illustrated in FIG. 4). When the support base TR is inserted into the main body, the first members E1 which is a projecting rod is engaged with the hole H. The support base TR can thereby be positioned by this configuration.

The scanner device SD reads information about a sheet P conveyed through the first transfer route PP1, and information about the position, form and color of an image formed on the sheet P. Specifically, the scanner device SD reads, as information about a sheet P conveyed through the first transfer route PP1, outline information of the sheet P. Also, the scanner device SD reads, as information about the position of an image, for example, information about the line segment intersection position of a cross hair which is formed at each of four corners of a sheet P.

The scanner device SD can determine if an image formation position is correct by reading information about the intersection positions. Furthermore, the scanner device SD reads information about line segments as information about the form of an image. The scanner device SD can determine, by reading information about line segments, if the image formation condition is appropriate, for example, if a line is straight, if the thickness of a line is appropriate, or the like.

This type of the scanner device SD is fixed to the main body side by second members E2 which are attached to the frame member FM. Specifically, the second members E2 consist of two plate members PM and two connection rods CR. The two plate members PM are attached to an upper front part UFP and an upper rear part URP of the frame member FM respectively. The two connection rods CR serve to connect between the two plate members PM. The scanner device SD is supported and fixed to the main body side by the two connection rods CR passing through the housing (symbol CH1 as described below) of the scanner device SD.

Incidentally, the first background member BM1 is located in the opposite side of the scanner device SD with the first transfer route PP1 therebetween. The first background member BM1 serves as a background when the scanner device SD reads various information. The first background member BM1 has a profile of a polygon (for example, hexagon) in a front view. The first background member BM1 can be rotated around the central axis "a" located at the center thereof. Colors such as white and black are assigned to the faces of the polygonal body of the first background member BM1. When a white-base sheet P is conveyed, the first background member BM1 rotates in order that a black face is directed to the scanner device SD. When a black-base sheet P is conveyed, the first background member BM1 rotates in order that a white face is directed to the scanner device SD. The image reading apparatus 300 can thereby easily detect the surrounding edges of a sheet P with reference to the difference in brightness between the sheet P and the background.

Figure 5:
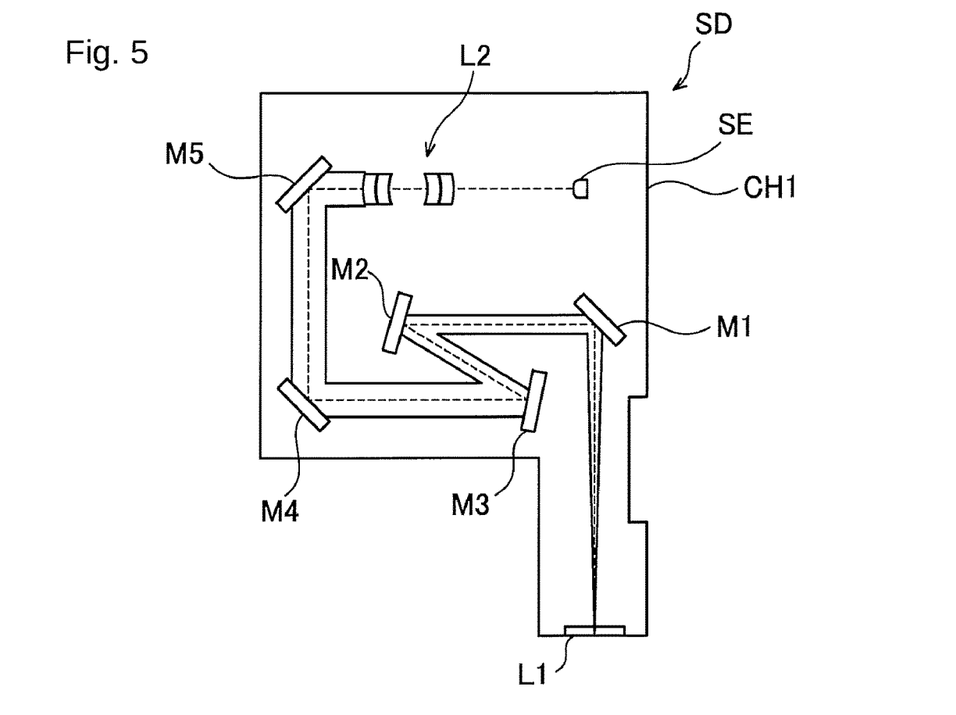
FIG. 5 is a front view for showing details of a scanner device shown in FIG. 3 and FIG. 4.

FIG. 5 is a front view for showing details of the scanner device SD shown in FIG. 3 and FIG. 4. As illustrated in FIG. 5, the scanner device SD includes a housing (first housing) CH1 which is formed into an approximately hook-type shape as seen from the front side. The scanner device SD is provided with first to fifth mirrors M1 to M5 (optical system), first and second lens units L1 and L2 (optical system), and a CCD (Charge Coupled Device) line sensor SE.

The first lens unit L1 consists of a lens facing in the first transfer route PP1 side. The first to fifth mirrors M1 to M5 are arranged to reflect light input through the first lens unit L1 and lead the light to the second lens unit L2 for the purpose of securing a necessary light path. The second lens unit L2 images light led by the first to fifth mirrors M1 to M5 on the CCD line sensor SE. The CCD line sensor SE reads various information of a sheet P from the imaged light. The information which is read is transmitted to a control unit which is not shown in the figure. Incidentally, when vibration is applied, optical path deviation may occurs in the scanner device SD which includes a plurality of optical systems and the CCD line sensor SE. The scanner device SD is thereby a read function unit which is preferably protected from vibration.

Referring to FIG. 3 and FIG. 4 again. The spectrophotometer CI reads information about colors of an image formed on a sheet P which is conveyed through the second transfer route PP2. The spectrophotometer CI is highly accurately positioned in relation to the second transfer route PP2. The positioning error is within ±0.2 mm or smaller. Namely, the spectrophotometer CI is fixed to the support base TR in order that the distance between the spectrophotometer CI and the second transfer route PP2 is within a predetermined design value±0.2 mm. The spectrophotometer CI includes a photometric function unit incorporated in a housing (second housing) CH2 which is approximately rectangular in a front view. The spectrophotometer CI can read colors of an image, for example, by measuring intensity of light at each wavelength.

Incidentally, the housing CH2 is arranged to be fitted into the hook-like portion of the housing CH1. In other words, the housing CH1 and the housing CH2 approximately form a rectangular in combination as seen from the front side so that the setting space thereof is optimized.

The color information read by the spectrophotometer CI is transmitted to a control unit which is not shown in the figure. The control unit calibrates colors by comparing color information read by the scanner device SD with color information read by the spectrophotometer CI. After once performing this calibration process, it is possible to increase the accuracy of colorimetrically measurement with the scanner device SD so that the image reading apparatus 300 can perform accurate color detection only with the scanner device SD at the time of large volume printing.

The second background member BM2 is located in the opposite side of the spectrophotometer CI with the second transfer route PP2 therebetween. The second background member BM2 is fixed to the support base TR in this location. When reading colors of images formed on thin paper, because of the transparency of the thin paper, the colorimetric measurement result may be different from that of images formed on thick paper even with the same colors. The second background member BM2 is a member for preventing such a discrepancy.

The motor M shown in FIG. 3 drives various conveyance roller pairs R1 to R3 for conveying a sheet P. Incidentally, while only one motor M is illustrated in FIG. 3 for the sake of clarity in illustration, a plurality of motors may be used.

The first conveyance roller pair R1 is located in the upstream side of the first transfer route PP1. The second conveyance roller pair R2 is located in the upstream side of the second transfer route PP2. The third conveyance roller pair R3 is located in the downstream side of the second transfer route PP2. Each of the conveyance roller pairs R1 to R3 consists of a drive roller which is driven by the motor M and a non-driven roller which freely rotates.

Furthermore, the second paper conveying route PP2 is provided with a pair of guide plates GB. The pair of guide plates GB serve to guide conveyance of a sheet P. The pair of guide plates GB consists of an upper guide plate GB1 and a lower guide plate GB2. These guide plates GB1 and GB2 are arranged approximately in parallel with each other. The spectrophotometer CI as described above is mounted on the upper guide plate GB1.

Figure 6:
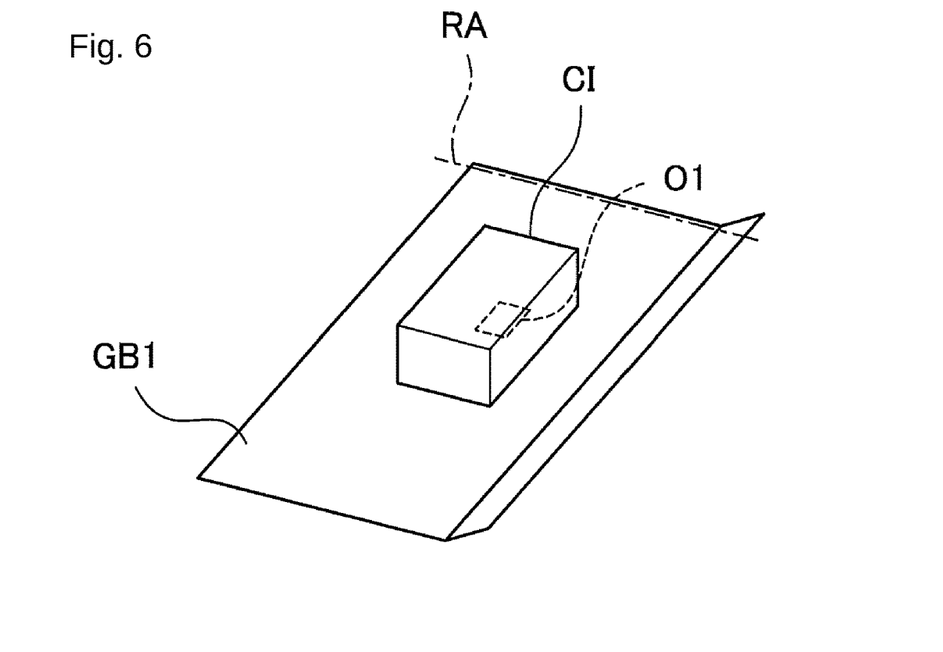
FIG. 6 is a schematic perspective view for showing the relationship between a spectrophotometer and an upper guide plate as shown in FIG. 3 and FIG. 4.

FIG. 6 is a schematic perspective view for showing the relationship between the spectrophotometer CI and the upper guide plate GB1 as shown in FIG. 3 and FIG. 4. As shown in FIG. 6, the spectrophotometer CI is located in the vicinity of the middle of the upper guide plate GB1. The spectrophotometer CI is not necessarily directly mounted on the upper guide plate GB1, but may be mounted in the vicinity of the middle of the upper guide plate GB1 with another member therebetween.

An opening O1 is formed through the upper guide plate GB1 in a position corresponding to the spectrophotometer CI. The reading side (lens section) of the spectrophotometer CI faces a sheet P side through the opening O1. A rotation axis RA is installed at the rear end of the upper guide plate GB1. The upper guide plate GB1 is thereby capable of rotating around the rotation axis RA.

Figure 7:
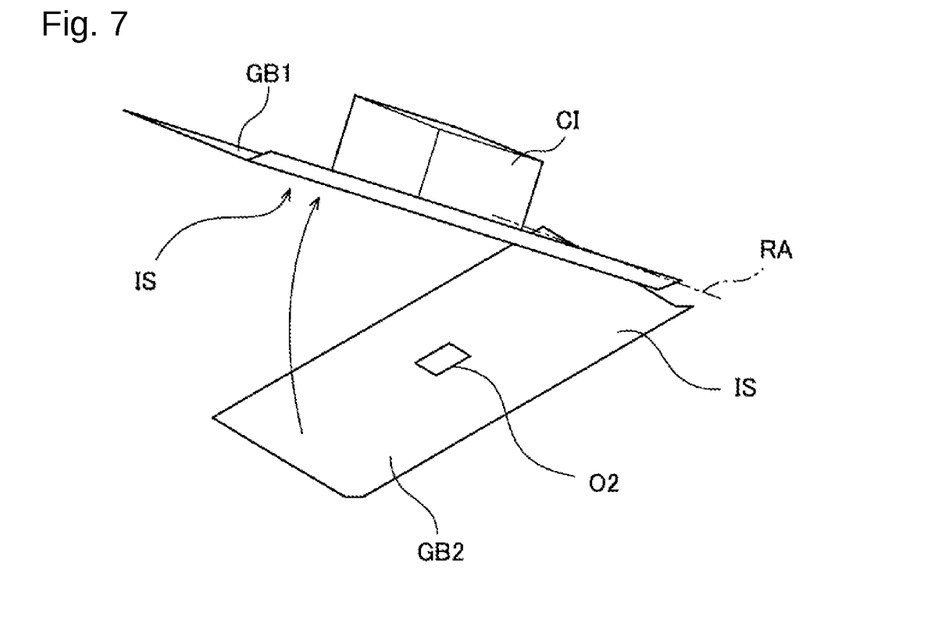
FIG. 7 is a view for schematically showing the configuration of the upper guide plate, as illustrated in FIG. 6, which is rotating.

FIG. 7 is a view for schematically showing the configuration of the upper guide plate GB1, as illustrated in FIG. 6, which is rotating. As shown in FIG. 7, the upper guide plate GB1 is capable of rotating upward around the rotation axis RA at the rear end. Because of this, the pair of guide plates GB are configured in order that the relative positional relationship between the upper guide plate GB1 and the lower guide plate GB2 can be changed. The pair of guide plates GB are configured to expose at least part of the inner surface IS of the pair of guide plates GB in order to prevent jam handling from being difficult. Namely, in the image reading apparatus 300, the spectrophotometer CI and the support base TR are integrated. Because of this, even if the support base TR is pulled out, jam handling may become difficult on the second transfer route PP2 due to presence of the spectrophotometer CI. However, such difficulty is resolved by making it possible to change the relative positional relationship of the pair of guide plates GB.

Incidentally, the expression "expose at least part" in the above description means that the relative positional relationship of the pair of guide plates GB is changed so that at least part of the inner side IS of one guide plate GB is no longer located in the opposed position to the inner side IS of the other guide plate GB. As shown in FIG. 7, an opening O2 is formed through the lower guide plate GB2 in a position corresponding to the second background member BM2. The second background member BM2 can face the sheet P side through the opening O2.

Furthermore, as shown in FIG. 3 and FIG. 4, the pair of guide plates GB are arranged to cover the reading side of the spectrophotometer CI and the second background member BM2. This structure "arranged to cover" means that the opposed position to the reading side of the spectrophotometer CI corresponds to the installation area where the lower guide plate GB2 exists and the opposed position to the second background member BM2 corresponds to the installation area where the upper guide plate GB1 exists. When the relative positional relationship of the pair of guide plates GB is changed, as has been discussed above, it is preferred that the reading side of the spectrophotometer CI and the second background member BM2 are exposed. The maintainability of the spectrophotometer CI and the second background member BM2 can thereby be improved. In this case, this "exposed" structure means that the opposed position to the reading side of the spectrophotometer CI becomes out of the installation area where the lower guide plate GB2 exists and the opposed position to the second background member BM2 becomes out of the installation area where the upper guide plate GB1 exists.

Figure 8:
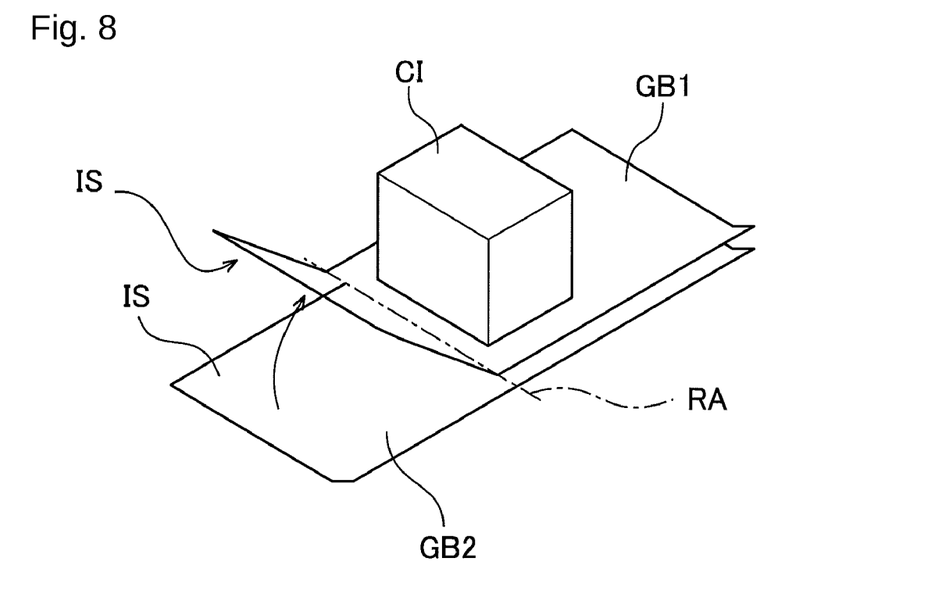
FIG. 8 is a view for schematically showing another example of the configuration of the upper guide plate, as illustrated in FIG. 6, which is rotating.

FIG. 8 is a view for schematically showing another example of the configuration of the upper guide plate GB1, as illustrated in FIG. 6, which is rotating. The upper guide plate GB1 is not necessarily designed to be capable of rotating around the rotation axis RA at the rear end. For example, as illustrated in FIG. 8, the rotation axis RA of the upper guide plate GB1 may be located in a slightly front side of the center of the upper guide plate GB1 (in the front side of the spectrophotometer CI). It is therefore possible to rotate, of the upper guide plate GB1, only the portion located in the front side of the spectrophotometer CI around the rotation axis RA.

Meanwhile, in the example shown in FIG. 8, it is possible to expose at least part of the inner surface IS of the pair of guide plates GB by making it possible to change the relative positional relationship of the pair of guide plates GB. However, in the example shown in FIG. 8, it is not possible to expose the reading side of the spectrophotometer CI and the second background member BM2. For this reason, the example shown in FIG. 7 is preferable the example shown in FIG. 8.

Furthermore, in addition to the examples shown in FIG. 7 and FIG. 8, the pair of guide plates GB may be configured such that at least one of the upper guide plate GB1 and the lower guide plate GB2 can slidably move while maintaining parallel arrangement thereof. Also, the pair of guide plates GB may be configured such that only the lower guide plate GB2 can rotate, or that both the guide plates GB can rotate.

Referring to FIG. 3 and FIG. 4 again, in the structure as described above, the reading site of the scanner device SD and the reading site of the spectrophotometer CI is separated from each other by no greater than a predetermined distance in the direction along the paper conveying route PP. This structure can inhibit color variation due to thermochromism when reading colors with the scanner device SD and the spectrophotometer CI.

Next, the operation of the image reading apparatus 300 according to the present embodiment will be explained. First, a sheet P is introduced into the image reading apparatus 300 from the image forming apparatus 200. The sheet P is passed through the reading site of the scanner device SD and the reading site of the spectrophotometer CI and discharged from the image reading apparatus 300 by driving the first to third conveyance rollers R1 to R3.

When the motor M drives the first to third conveyance rollers R1 to R3, vibration is generated. However, since the motor M is mounted on the support base TR together with the paper conveying route PP and the spectrophotometer CI, the paper conveying route PP and the spectrophotometer CI are vibrated together so that it is easy to maintain the positional relationship between the paper conveying route PP and the spectrophotometer CI. On the other hand, since the scanner device SD is fixed to the main body side, the vibration of the motor M is hardly transmitted to the scanner device SD.

Particularly, since the vibration of the motor M is transmitted to the scanner device SD through the support base TR, the frame member FM and the like, no large vibration is transmitted to the scanner device SD, which is thereby protected from vibrations.

On the other hand, it is assumed that a paper jam occurs on the first transfer route PP1. In this case, the first transfer route PP1 is exposed by pulling out the support base TR, and an operator can perform jam handling. Furthermore, it is assumed that a paper jam occurs on the second transfer route PP2. In this case, an operator pulls out the support base TR, and operate the upper guide plate GB1 of the pair of guide plates GB. The operator can thereby open the second transfer route PP2 and perform jam handling. This is true when performing maintenance of the reading side of the spectrophotometer CI and the second background member BM2.

In accordance with the image reading apparatus 300 and the image forming system 1 of the present embodiment, as has been discussed above, the scanner device SD is not mounted on the support base TR, but fixed to the main body side. Because of this, the scanner device SD is separated from the paper conveying route PP and the motor M for conveying a sheet P, and thereby hardly receives motor vibrations. On the other hand, the spectrophotometer CI is fixed to the support base TR in a position spaced from the paper transfer route PP by a predetermined distance, and therefore the spectrophotometer CI is integrated with the support base TR having the paper conveying route PP. By this configuration, the position accuracy of the spectrophotometer CI can be improved in relation to the paper conveying route PP. Accordingly, in the case where there are provided a drawer-type structure in the form of the support base TR and a plurality of image reading units (the scanner device SD and the spectrophotometer CI), it is possible to optimize the arrangement of the plurality of image reading units.

On the other hand, the image reading apparatus 300 and the image forming system 1 are provided with the second background member BM2. Because of this, even if there is a substantial influence of a background on measurement when reading colors of a thin sheet P, it is possible to inhibit such an influence and contribute to stabilized color measurement. In addition to this, since the second background member BM2 is mounted on the support base TR, it is possible to inhibit the second background member BM2 from shifting.

Also, the pair of guide plates GB are configured in order that the relative positional relationship between the upper guide plate GB1 and the lower guide plate GB2 can be changed, and that at least part of the inner surface IS of the pair of guide plates GB can be exposed. Because of this, since the inner surface IS of the pair of guide plates GB can be exposed when the guide plates GB are moved, it is possible to reduce the possibility that, when the support base TR is pulled out, jam handling on the second transfer route PP2 becomes difficult because of the presence of the spectrophotometer CI which is integrated with the support base TR.

Furthermore, the pair of guide plates GB are arranged to cover the optical surface of the spectrophotometer CI and the second background member BM2. Because of this, when the support base TR is pulled out and the pair of guide plates GB is not moved, the optical surface of the spectrophotometer CI is not exposed so that it can be protected. On the other hand, when maintenance of the optical surface of the spectrophotometer CI is to be performed, it is only required to pull out the support base TR and move the pair of guide plates GB so that user convenience can be improved.

Furthermore, the reading sites are separated from each other along the paper conveying route PP within a predetermined distance. A sheet P is passed through the first transfer route PP1, and immediately thereafter reaches the second transfer route PP2. Accordingly, it is possible to inhibit color variation due to thermochromism when reading colors with the scanner device SD and the spectrophotometer CI respectively.

Also, the housing CH2 is arranged to be fitted into the hook-like portion of the housing CH1. Because of this, it is possible to reduce a wasted space and contribute to miniaturization. Particularly, in the case of the scanner device SD consisting of the CCD line sensor SE and the optical system such as the mirrors M1 to M5, a necessary light path has to be secured by the use of the mirrors M1 to M5. As compared with a rectangular shape, therefore, the hook-type shape is suitable for securing the light path so that the system can be easily designed.

Furthermore, the support base TR is positioned by the first members E1 which is provided on the frame member FM, and the scanner device SD is fixed by the second members E2 which is provided on the frame member FM. The relative position between the support base TR and the scanner device SD can thereby be appropriate through the frame member FM without directly connecting them for the purpose of making appropriate the relative position therebetween. In addition to this, vibration is hardly transmitted to the scanner device SD from the motor M which is installed in the support base TR as compared with the case where the support base TR and the scanner device SD are directly connected to each other in order to determine the relative position therebetween.

The image reading apparatus and the image forming system have been explained based on the embodiment in accordance with the present invention. However, it is not intended to limit the present invention to the precise form described, and obviously many modifications and variations are possible without departing from the scope of the invention. Also, if possible, the techniques of the embodiments can be combined as well as known techniques and the like.

For example, while the image reading apparatus 300 is independently installed in the case of the above embodiment, the present invention is not limited to this installation, but the image reading apparatus 300 can be incorporated in the image forming apparatus 200. Also in this case, there are similar advantages as in the above embodiment.

What is claimed is:

1. An image reading apparatus comprising:
    a first image reading unit configured to sense a sheet conveyed on a paper conveying route and sense position, form, and color of an image formed on the sheet;
    a second image reading unit configured to sense color of the image formed on the sheet conveyed on the paper conveying route;
    a support base which incorporates the paper conveying route and a motor for conveying the sheet and can be pulled out from a main body together with the paper conveying route and the motor,
    wherein the first image reading unit is not mounted on the support base but fixed to a main body of the image reading apparatus, and
    wherein the second image reading unit is mounted on the support base and fixed to the support base in a position spaced from the paper transfer route by a predetermined distance.

2. The image reading apparatus of claim 1 further comprising:
    a background member provided in a position opposite the second image reading unit to provide a background when the second image reading unit senses color,
    wherein the background member is fixed to the support base in the position.

3. The image reading apparatus of claim 2
    wherein the paper conveying route includes a first transfer route on which is conveyed the sheet which is sensed by the first image reading unit and a second transfer route on which is conveyed the sheet which is sensed by the second image reading unit,
    wherein the second transfer route is provided with a pair of guide plates which are arranged in parallel with each other to guide conveyance of the sheet,
    wherein at least one of the pair of guide plates is configured to change the relative positional relationship to the other guide plate such that at least part of the inner surface of the pair of guide plates can be exposed.

4. The image reading apparatus of claim 3
    wherein the pair of guide plates are arranged to cover a reading side of the second image reading unit and the background member, and
    wherein at least one of the pair of guide plates is configured to change the relative positional relationship to the other guide plate such that at least part of the inner surface of the pair of guide plates can be exposed, and that the optical surface of the second image reading unit and the background member can be exposed.

5. The image reading apparatus of claim 3 wherein the reading sites of the first image reading unit and the second image reading unit are separated from each other along the paper conveying route within a predetermined distance.

6. The image reading apparatus of claim 1 wherein the first image reading unit has a first housing which is formed into an approximately hook-type shape as seen from the front side,
wherein the second image reading unit has a second housing which is formed into an approximately rectangular shape as seen from the front side, and
the second housing in the form of the rectangular shape is arranged to be fitted into a hook-like portion of the first housing in the form of the hook-type shape.

7. The image reading apparatus of claim 1 wherein the first image reading unit is a scanner device having a CCD line sensor and an optical system, and
wherein the second image reading unit is a spectrophotometer.

8. The image reading apparatus of claim 1 wherein, when inserted into the main body, the support base is positioned by a first member which is provided on a frame member forming the main body, and
wherein the first image reading unit is fixed to the main body through a second member which is provided on the frame member.

9. An image forming apparatus which forms an image on a sheet and incorporates an image reading apparatus comprising:
a first image reading unit configured to sense a sheet conveyed on a paper conveying route and sense position, form, and color of an image formed on the sheet;
a second image reading unit configured sense color of the image formed on the sheet conveyed on the paper conveying route;
a support base which incorporates the paper conveying route and a motor for conveying the sheet and can be pulled out from a main body together with the paper conveying route and the motor,
wherein the first image reading unit is not mounted on the support base but fixed to a main body of the image reading apparatus, and
wherein the second image reading unit is mounted on the support base and fixed to the support base in a position spaced from the paper transfer route by a predetermined distance.

10. An image forming system including an image forming apparatus which forms an image on a sheet and an image reading apparatus comprising:
a first image reading unit configured to sense a sheet conveyed on a paper conveying route and sense position, form, and color of an image formed on the sheet;
a second image reading unit configured to sense color of the image formed on the sheet conveyed on the paper conveying route;
a support base which incorporates the paper conveying route and a motor for conveying the sheet and can be pulled out from a main body together with the paper conveying route and the motor,
wherein the first image reading unit is not mounted on the support base but fixed to a main body of the image reading apparatus, and
wherein the second image reading unit is mounted on the support base and fixed to the support base in a position spaced from the paper transfer route by a predetermined distance.

11. The image forming system of claim 10 wherein the image reading apparatus further comprises a background member provided in a position opposite the second image reading unit to provide a background when the second image reading unit senses color, and
wherein the background member is fixed to the support base in the position.

12. The image forming system of claim 11 wherein the paper conveying route includes a first transfer route on which is conveyed the sheet which is sensed by the first image reading unit and a second transfer route on which is conveyed the sheet which is sensed by the second image reading unit,
wherein the second transfer route is provided with a pair of guide plates which are arranged in parallel with each other to guide conveyance of the sheet,
wherein at least one of the pair of guide plates is configured to change the relative positional relationship to the other guide plate such that at least part of the inner surface of the pair of guide plates can be exposed.

13. The image forming system of claim 12 wherein the pair of guide plates are arranged to cover a reading side of the second image reading unit and the background member, and
wherein at least one of the pair of guide plates is configured to change the relative positional relationship to the other guide plate such that at least part of the inner surface of the pair of guide plates can be exposed, and that the optical surface of the second image reading unit and the background member can be exposed.

14. The image forming system of claim 12 wherein the reading sites of the first image reading unit and the second image reading unit are separated from each other along the paper conveying route within a predetermined distance.

15. The image forming system of claim 10 wherein the first image reading unit has a first housing which is formed into an approximately hook-type shape as seen from the front side,
wherein the second image reading unit has a second housing which is formed into an approximately rectangular shape as seen from the front side, and
the second housing in the form of the rectangular shape is arranged to be fitted into a hook-like portion of the first housing in the form of the hook-type shape.

16. The image forming system of claim 10 wherein the first image reading unit is a scanner device having a CCD line sensor and an optical system, and
wherein the second image reading unit is a spectrophotometer.

17. The image forming system of claim 10 wherein, when inserted into the main body, the support base is positioned by a first member which is provided on a frame member forming the main body, and
wherein the first image reading unit is fixed to the main body through a second member which is provided on the frame member.

* * * * *